United States Patent [19]
Koto et al.

[11] Patent Number: 4,980,144
[45] Date of Patent: Dec. 25, 1990

[54] PROCESS FOR PURIFYING NITROGEN TRIFLUORIDE GAS

[75] Inventors: Nobuhiko Koto; Toshihiko Nishitsuji; Naruyuki Iwanaga; Isao Harada, all of Yamaguchi, Japan

[73] Assignee: Mitsui Toatsu Chemicals, Inc., Tokyo, Japan

[21] Appl. No.: 356,179

[22] Filed: May 24, 1989

[30] Foreign Application Priority Data

Jun. 1, 1988 [JP] Japan ................ 63-135061

[51] Int. Cl.$^5$ ............................. B01D 53/34
[52] U.S. Cl. .................... 423/406; 423/240
[58] Field of Search .......... 423/484, 489, 406, 462, 423/235, 240 R, 351

[56] References Cited

U.S. PATENT DOCUMENTS 4,156,598  5/1979  Woytek et al. ................ 55/68
4,193,976  3/1980  Lileck et al. ................ 423/406

FOREIGN PATENT DOCUMENTS 3151608  6/1988  Japan ................ 423/499

Primary Examiner—Gary P. Straub
Assistant Examiner—Brian M. Bolam
Attorney, Agent, or Firm—Fisher, Christen & Sabol

[57] ABSTRACT

This invention relates to a process for obtaining a high purity nitrogen trifluoride gas which is used as a dry etching agent for semiconductors or a cleaning gas for CVD apparatus, etc., particularly to a process for removing oxygen difluoride. This is a process for purifying a nitrogen trifluoride gas by, after removing hydrogen fluoride from a nitrogen trifluoride crude gas, contacting with at least one aqueous solution containing one selected from the group consisting of sodium thiosulfate, hydrogen iodide and sodium sulfide.

10 Claims, 1 Drawing Sheet

PROCESS FOR PURIFYING NITROGEN TRIFLUORIDE GAS

BACKGROUND OF THE INVENTION (1) Field of the Invention

The present invention relates to a process for purifying a nitrogen trifluoride gas. More specifically, it relates to a process for particularly removing oxygen difluoride from a nitrogen trifluoride gas.

(2) Description of the Prior Art

In recent years, a nitrogen trifluoride ($NF_3$) gas is noticed as a dry etching agent for semiconductors and as a cleaning gas for CVD apparatus, but the nitrogen trifluoride gas for use in these use purposes is required to be pure as highly as possible.

The $NF_3$ gas can be prepared by a variety of methods such as the so-called molten salt electrolysis method in which $NH_4F \cdot xHF$ which is prepared by acidic ammonium fluoride alone or ammonium fluoride and hydrogen fluoride as the starting materials is electrolyzed, or the method in which ammonia and fluorine are reacted. The present inventors have confirmed that $NF_3$ gases obtained by any of the methods contain oxygen difluoride ($OF_2$) in most of the cases with a relatively large amount. Particularly, in $NF_3$ gas obtained by the molten salt electrolysis method, at most several hundred ppm or so (wherein "ppm" represents a volume standard, hereinafter the same) thereof are contained.

It has been known that in the $NF_3$ gases prepared by the above methods, various compounds such as nitrogen ($N_2$), dinitrogen difluoride ($N_2F_2$), nitrous oxide ($N_2O$), carbon dioxide ($CO_2$) and unreacted hydrogen fluoride (HF) are contained as impurities.

Accordingly, in order to obtain a high purity $NF_3$ gas, it is required to remove these impurities, and various methods for purification have been proposed. Regarding $OF_2$, in "Deutsche Luft und Raumfahrt", Forschungsbericht, Oktober 1966, Herstellung von Stickstoff-fluoriden durch Elektrolyse, p. 21, lines 19 to 20, there is described that $OF_2$ in a $NF_3$ gas can be reduced by using sodium sulfite and potassium iodide aqueous solutions. Also, in "Fluorine Chemistry and Industry, Advance and Application", edited by Nobuatsu Watanabe (Published by Kagaku Kogyosha), p. 208 (1973), there is described the method that a $NF_3$ gas is washed with an aqueous sodium thiosulfate solution to remove $N_2O$ in the $NF_3$ gas. However, there is not described that $OF_2$ in the $NF_3$ gas can be removed.

Also, in J. Massonne, Chem. Ing. Techn. vol. 41(12), p. 695 (1969), there is described, as a method of removing $N_2F_2$ in a $NF_3$ gas, the method in which an aqueous solution such as of KI, HI, $Na_2S$, $Na_2S_2O_4$; or $Na_2SO_3$ is used to remove $N_2F_2$ therefrom. However, according to the method, for removing $N_2F_2$ completely, a relatively long time is required so that the reaction bath becomes considerably large as well as a large amount of chemicals is required. In this literature, no removal of $OF_2$ is described.

The present inventors have established the undermentioned quantitative method of $OF_2$ which uses a low temperature gas chromatography and confirmed that the content of $OF_2$ in a $NF_3$ gas sometimes reaches even to several hundred ppm.

Since the $OF_2$ is an oxygen-containing compound, it can be estimated that it is extremely dangerous in the step of purifying a $NF_3$ gas. Accordingly, in the case of purifying a $NF_3$ gas, it is necessary to possibly remove $OF_2$ at a relatively initial stage.

Also, if $OF_2$ remains in a $NF_3$ gas, it is inconvenient for further treating the $NF_3$ gas to obtain a high purity $NF_3$ gas. Moreover, if such an oxygen-containing compound is contained, it involves the problem that it exerts bad effect when the $NF_3$ gas is used as a dry etching agent for semiconductors or as a cleaning gas for CVD apparatus.

SUMMARY OF THE INVENTION

An object of the present invention is to provide a process for purifying nitrogen trifluoride gas in which oxygen difluoride in the nitrogen trifluoride gas can be removed with extremely good efficiency and economically.

That is, the present invention is a process for purifying a nitrogen trifluoride gas which comprises removing hydrogen fluoride from a nitrogen trifluoride gas containing hydrogen fluoride and oxygen difluoride by 100 ppm or lower, or using a nitrogen trifluoride gas containing 100 ppm or less of hydrogen fluoride, said nitrogen trifluoride gas being contacted with at least one aqueous solution containing one selected from the group consisting of sodium thiosulfate, hydrogen iodide and sodium sulfide.

For removing hydrogen fluoride, it is preferred to control the concentration of hydrogen fluoride to 100 ppm or lower by contacting a nitrogen trifluoride gas with water or an aqueous NaOH solution.

For removing oxygen difluoride, it is preferred that the $NF_3$ gas is contacted with the aforesaid at least one aqueous solution containing one selected from the group consisting of sodium thiosulfate, hydrogen iodide and sodium sulfide at a temperature of 0° to 20° C.

For the operation of the gas-liquid contact, it is preferred to use a gas scrubber.

DETAILED DESCRIPTION OF THE INVENTION

Figure 1:
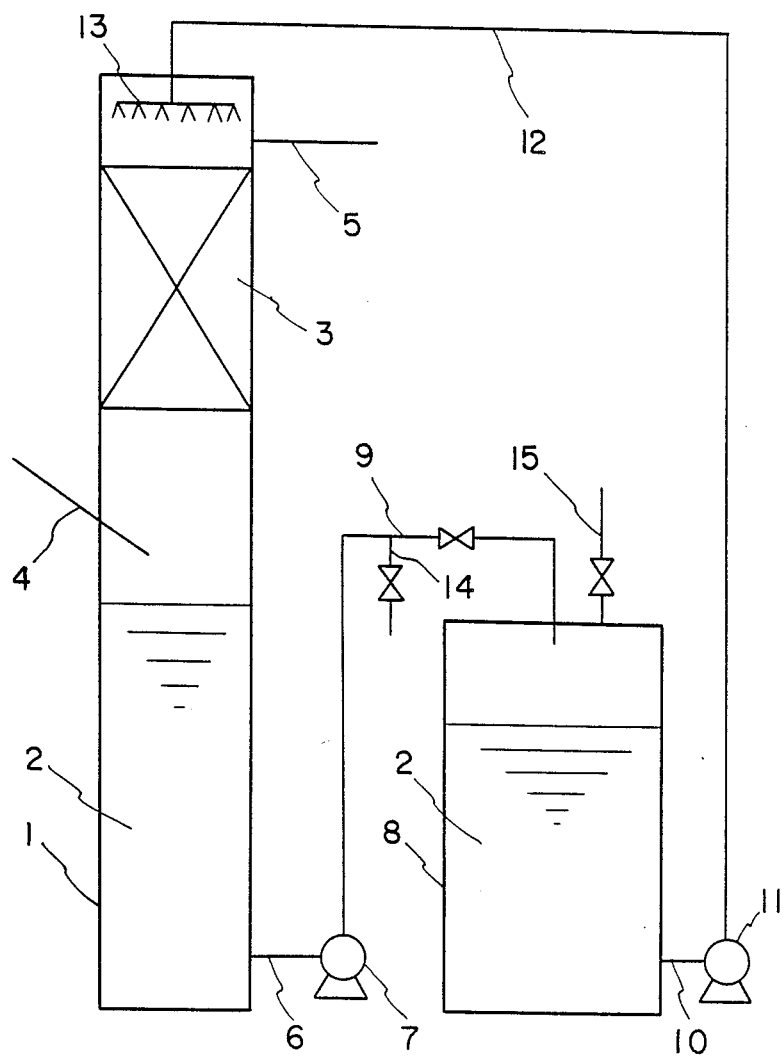
FIG. 1 is described as being a schematic vertical section of a gas scrubber apparatus for the operation of gas-liquid contact.

In the following, the present invention will be described in more detail.

$NF_3$ gases can be prepared by various methods such as the so-called molten salt electrolysis method in which $NH_4F \cdot xHF$ prepared by acidic ammonium fluoride alone or ammonium fluoride and hydrogen fluoride as the starting materials is electrolyzed, or the method in which ammonia and fluorine are reacted.

In the present invention, HF in a $NF_3$ gas should firstly be removed. The method of removing the HF is not particularly limited, but, for example, there may be employed the method in which, as shown in FIG. 1, by using a gas scrubber, water or an alkaline aqueous solution such as of sodium hydroxide, etc. is circulated in the gas scrubber and the $NF_3$ gas is contacted with the water or the alkaline aqueous solution so that HF is absorbed by the water or the above aqueous solution to remove it (in this case, the procedure is usually carried out with a concentration of the aqueous solution of generally 0.1 to 1% by weight) or the method in which by using a compound such as sodium fluoride (NaF) as an adsorbent, and the adsorbent and $NF_3$ gas are contacted at a temperature of 100° C. or so to adsorb and remove HF, and the like. In the step of removing HF, it is preferred that HF in a $NF_3$ gas is removed as much as possible. It is required to remove it at least by 100 ppm or less. It is needless to say that if a $NF_3$ gas containing 100 ppm or less of HF is used from the beginning, no HF removing process is required.

As the temperature of contacting the $NF_3$ gas with water or an aqueous alkaline solution, as in the removing process of $OF_2$ as mentioned below, it is preferred as low as possible in such a range that no hindrance is caused to the operation. But considering the facts that to use water is more economical and the $OF_2$ removing process is present thereafter, it is preferred in the range of, for example, 15° to 30° C. or so.

The $NF_3$ gas freed of HF mentioned above is then contacted with at least one aqueous solution containing one selected from the group consisting of sodium thiosulfate ($Na_2S_2O_3$), hydrogen iodide (HI) and sodium sulfide ($Na_2S$) to remove $OF_2$ contained therein.

The aqueous solution of $Na_2S_2O_3$, HI or $Na_2S$ (hereinafter simply mentioned as "the aqueous solution") to be used in the present invention can be easily obtained, in general, by dissolving commercially available these compounds for industrial use in water.

In the present invention, this aqueous solution can be used at a concentration of from about 0.1N to a saturation solubility level. The aqueous solution can be used at 0.1N to 2N. Preferably it is from 0.5N to 2N. If the concentration is less than 0.5N, removing rate of $OF_2$ becomes too late so that $OF_2$ cannot sufficiently be removed. To the contrary, if the concentration of the aqueous solution is at the neighbor of the saturation solubility, it is not economically advisable. Also, in the present invention, as mentioned below, contacting the $NF_3$ gas with the aqueous solution is carried out by using a gas scrubber, so it is not preferred since it becomes cause of trouble such as clog of pipings of these apparatus.

The temperature of contacting the $NF_3$ gas with the aqueous solution is not particularly limited, but if an amount of water in the $NF_3$ gas after contacting the aqueous solution is made as little as possible, operations in removing the other impurities become easy. Accordingly, the above contacting temperature is preferred as low as possible in such a range that no hindrance is caused to the operation, and it is usually carried out at a temperature of 0° to 20° C.

In the present invention, as the method of contacting the $NF_3$ gas with the aqueous solution, the method in which, by using a gas scrubber as shown in FIG. 1, the $NF_3$ gas is ventilated in the gas scrubber while circulating the above-mentioned aqueous solution in the gas scrubber, is preferably used.

In the method of using the gas scrubber, if a bed of packing is provided in the gas scrubber, filled with a Raschig ring, a nash ring, a teralet, etc., it is preferred since contacting the $NF_3$ gas with the circulating aqueous solution becomes good. Regarding the gas scrubber shown in FIG. 1, it is explained in Example 1 below.

Also, in this method, there is a merit that by varying the circulating amount or concentration of the above aqueous solution in correspondence to change in $OF_2$ concentration in the $NF_3$ gas, $OF_2$ can be effectively removed.

The time of contacting the aqueous solution with the $NF_3$ gas may vary depending on the concentration or circulating amount of the aqueous solution and the $OF_2$ content in the $NF_3$ gas. $OF_2$ contained can be suitably removed with the contacting time of about 2 to 1000 seconds.

The pressure of $NF_3$ ventilated in the gas scrubber is not particularly heightened, and if the pressure is capable of ventilating in the gas scrubber, a lower pressure is preferred since easily operable.

In the present invention, as mentioned above, it is preferred that HF contained in the $NF_3$ gas when contacting with the aqueous solution is previously removed as much as possible. It is required to remove it at least by 100 ppm or lower.

If HF is contained in the $NF_3$ gas, it is reacted with $Na_2S_2O_3$, etc. in the aqueous solution to form a fluoride such as sodium fluoride, etc. so that the concentration of $Na_2S_2O_3$, etc. in the aqueous solution becomes dilute. Thus, there causes the problem of inhibiting removal efficiency of $OF_2$. Also, there is the problem that the formed fluoride causes clog of pipings of the gas scrubber, etc.

The $NF_3$ gas freed of $OF_2$ mentioned above is then purified by removing impurities such as $N_2$, $N_2F_2$, $N_2O$, $CO_2$, etc. by conventionally known methods such as the method of contacting with Zeolite Molecular Sieves, etc. so that an extremely high purity $NF_3$ gas can be obtained.

Next, the analysis method of $OF_2$ in a $NF_3$ gas will be explained.

$OF_2$ in a $NF_3$ gas is analyzed by using a low temperature gas chromatography.

That is, in the case of using silica gel as a filler of the column of the low temperature gas chromatography, the temperature of the column is cooled from to $-80°$ C. or so. Thereafter, a $NF_3$ gas containing $OF_2$ is injected into the column of the above gas chromatography, and then the temperature of the column is raised at a rate of 5° C./min. This is the so-called temperature rising analysis method from a low temperature. The chromatograph obtained by the method gives peaks in the order of $N_2$, $OF_2$, $NF_3$, and further $N_2F_2$, $N_2O$ and $CO_2$. Accordingly, the content of $OF_2$ can be determined by the area percentage of the detected peak and the peak of the standard sample.

As described in detail hereinabove, the present invention is a method for removing $OF_2$ in a $NF_3$ gas and is a simple method which comprises using a $NF_3$ gas containing 100 ppm or less of HF from the beginning or removing HF from $NF_3$ gas containing HF and $OF_2$ and contacting the $NF_3$ gas with an aqueous solution of $Na_2S_2O_3$, etc. By enforcement of the present invention, $OF_2$ in a $NF_3$ gas can be selectively, efficiently and economically removed.

The present inventors have succeeded by the method of the present invention in obtaining a $NF_3$ gas containing substantially no $OF_2$, and this is an extremely epoch-making matter.

The $NF_3$ gas containing substantially no $OF_2$ is then purified by conventionally known methods such as contacting with Zeolite (Molecular Sieves), etc. to remove impurities such as $N_2$, $N_2F_2$, $N_2O$ and $CO_2$ contained so that an extremely high purity $NF_3$ gas can be obtained.

When the thus extremely high purity $NF_3$ gas is used particularly as a dry etching agent for semiconductors or a cleaning gas for CVD apparatus, it is clear that extremely good effect than before is expected.

Also, in the preparation of $NF_3$ gas, particularly, safeness at the purifying process is extremely improved so that it can be largely evaluated the effect that preparation of $NF_3$ gas can be realized stably.

EXAMPLES

In the following, the present invention will be explained in more detail be referring to the Examples, but it is sure that the present invention is not limited by these Examples. In the following, % and ppm each represent a volume standard otherwise specifically mentioned.

(Example 1)

A $NH_4F \cdot HF$ molten salt was electrolyzed to obtain a $NF_3$ gas. When the resulting $NF_3$ gas was analyzed with a low temperature gas chromatography to obtain the result of the $OF_2$ content being 740 ppm. Also, the content of HF was 550 ppm. By using a gas scrubber shown in FIG. 1, HF contained in the $NF_3$ gas was removed.

In FIG. 1, 1 is a gas scrubber, 2 is water or an aqueous solution, 3 is a bed of packing, 4 is a $NF_3$ gas inlet tube, 5 is a $NF_3$ gas outlet tube, 6, 9, 10 and 12 are pipings, 7 and 11 are pumps, 8 is a storage tank, 13 is a sprinkle tube, 14 is an exhaust tube, and 15 is a supplemental tube.

That is, water was filled in the storage tank 8, and the water was sprinkled from the sprinkle tube 13 through the piping 12 by the pump 11 with a flow amount of 100 ml/min. Also, water 2 in the gas scrubber 1 was exhausted to out of the system through the piping 9 and the exhaust tube 14 by the pump 7. Further, to the storage tank 8, water was supplemented from the supplemental tube 15 with the amount equivalent to the exhausted one to maintain the water level in the gas scrubber 1 constantly. The gas scrubber 1 had a height of 2 m and an inner diameter of 50 cm, and in the bed of packing 3, Raschig ring (both of diameter and height of 8 mm) was filled with a height of 500 mm.

At this state, the $NF_3$ gas containing HF obtained by the above method was ventilated from the $NF_3$ gas inlet tube 4 into the gas scrubber 1 with a flow amount of 500 Nml/min and taken out from the $NF_3$ gas outlet tube 5 to remove HF in the $NF_3$ gas.

The HF content in the $NF_3$ gas taken out from the gas scrubber 1 was, as shown in Table 1, 42 ppm.

Next, by using the same gas scrubber as mentioned above, 10 liters of a 1N $Na_2S_2O_3$ aqueous solution was charged into the storage tank 8 under the conditions as shown in Table 1. In the same manner as the above removal of HF, that is, by using the pump 11, the $Na_2S_2O_3$ aqueous solution was sprinkled to the gas scrubber 1 with a flow amount of 100 ml/min. Also, the aqueous solution 2 in the gas scrubber 1 was circulated to the storage tank 8 through the piping 9 by the pump 7 to maintain the water level in the gas scrubber 1 constantly. And at this state, the $NF_3$ gas freed of HF was ventilated continuously from the $NF_3$ gas inlet tube 4 into the gas scrubber 1 and taken out from the $NF_3$ gas outlet tube 5.

After 5 hours of the ventilation, the gas was low temperature collected from the $NF_3$ gas outlet tube 5, and analyzed by a gas chromatography. As a result, the content of $OF_2$ was, as shown in Table 1, 10 ppm or less.

Also, $Na_2S_2O_3$ was supplemented to the storage tank 8 once per day so that the concentration of $Na_2S_2O_3$ in the storage tank 8 was maintained at 1N, and removal of $OF_2$ was carried out continuously for 240 hours. But the content of $OF_2$ in the $NF_3$ gas ventilated was maintained at 10 ppm or less and no trouble was caused.

(Examples 2 and 3)

In place of the $Na_2S_2O_3$ aqueous solution, aqueous solutions with kinds and concentrations shown in Table 1 were employed. Also, by using $NF_3$ gases having the compositions as shown in Table 1, removals of HF and $OF_2$ in each $NF_3$ gas were carried out in the same manner as in Example 1 under the conditions shown in Table 1.

The content of $OF_2$ in each $NF_3$ gas ventilated in the gas scrubber 1 at after 5 hours of the ventilation at the $OF_2$ removal process after the HF removal process was, as shown in Table 1, 10 ppm or less, respectively, and no trouble was caused.

TABLE 1

| | | Example 1 | Example 2 | Example 3 |
|---|---|---|---|---|
| Aqueous solution | Kinds | $Na_2S_2O_3$ | HI | $Na_2S$ |
| | Concentration (Normal) | 1.0 | 0.5 | 0.5 |
| Conditions of scrubber | Liquid amount of storage tank 8 (l) | 10 | 10 | 10 |
| | Aqueous solution circulated amount (ml/min.) | 100 | 100 | 100 |
| | Temperature of aqueous solution (°C.) | 15 | 15 | 15 |
| Ventilation conditions | $NF_3$ gas flowing amount (Nml/min.) | 500 | 500 | 500 |
| | $NF_3$ gas pressure (kg/cm$^2$-G) | 0.2 | 0.2 | 0.2 |
| Gas analyzed values | Crude gas | | | |
| | $NF_3$ (%) | 55 | 55 | 55 |
| | $N_2$ (%) | 43 | 43 | 43 |
| | HF (ppm) | 550 | 510 | 540 |
| | $OF_2$ (ppm) | 740 | 710 | 720 |
| HF after water scrubber ventilation (ppm) | | 42 | 40 | 45 |
| Gas after ventilation | HF (ppm) | 10 or less | 10 or less | 10 or less |
| | $OF_2$ (ppm) | 10 or less | 10 or less | 10 or less |

Note
(1) Crude gas means $NF_3$ gas as it were obtained by the molten salt electrolysis method.
(2) Gas after ventilation means $NF_3$ gas after ventilating the gas scrubber in which an aqueous solution is circulated.

(Comparative examples 1 to 3)

By using $NF_3$ gases having the compositions shown in Table 2, which had been obtained by the molten salt electrolysis method, and without previously removing HF in each gas, removal of $OF_2$ in each $NF_3$ gas was carried out by using the gas scrubber used in Example 1 under the conditions shown in Table 2 in the same manner as in Example 1.

$NF_3$ gases before ventilation of the gas scrubber 1 and after 5 hours of the ventilation were analyzed by the low temperature gas chromatography and the results were shown in Table 2. From the results in Table 2, it can be understood that the removing ratio of $OF_2$ becomes low when the content of HF in a $NF_3$ gas is much.

Also, in Comparative example 1, $Na_2S_2O_3$ was supplemented to the storage tank 8 once per day so that the concentration of $Na_2S_2O_3$ was maintained at 1N, and removal of $OF_2$ was carried out continuously. As a result, after 160 hours, the piping 9 to circulate the $Na_2S_2O_3$ aqueous solution into the storage tank 8 was clogged. When the cause was investigated, scale due to sodium fluoride was found at the inside of the piping 9.

This kind of scale is considered to be formed by reacting HF in the $NF_3$ gas and $Na_2S_2O_3$.

TABLE 2

|  |  | Comparative Example 1 | Comparative Example 2 | Comparative Example 3 |
|---|---|---|---|---|
| Aqueous solution | Kinds | $Na_2S_2O_3$ | HI | $Na_2S$ |
|  | Concentration (Normal) | 1.0 | 0.5 | 0.5 |
| Conditions of scrubber | Liquid amount of storage tank 8 (l) | 10 | 10 | 10 |
|  | Aqueous solution circulated amount (ml/min.) | 100 | 100 | 100 |
|  | Temperature of aqueous solution (°C.) | 15 | 15 | 15 |
| Ventilation conditions | $NF_3$ gas flowing amount (Nml/min.) | 500 | 500 | 500 |
|  | $NF_3$ gas pressure (kg/cm$^2$-G) | 0.2 | 0.2 | 0.2 |
| Gas analyzed values | Crude gas $NF_3$ (%) | 55 | 55 | 55 |
|  | $N_2$ (%) | 43 | 43 | 43 |
|  | HF (ppm) | 470 | 520 | 580 |
|  | $OF_2$ (ppm) | 670 | 710 | 700 |
|  | Gas after ventilation HF (ppm) | 30 | 29 | 41 |
|  | $OF_2$ (ppm) | 40 | 31 | 48 |

Note
(1) Crude gas means $NF_3$ gas as it were obtained by the molten salt electrolysis method.
(2) Gas after ventilation means $NF_3$ gas after ventilating the gas scrubber in which an aqueous solution is circulated.

What is claimed is:

1. A process for purifying a nitrogen trifluoride gas containing at least oxygen difluoride which comprises removing hydrogen fluoride to 100 ppm or less in the nitrogen trifluoride gas only when a nitrogen trifluoride gas contains more than 100 ppm hydrogen fluoride and then said nitrogen trifluoride gas being contacted with at least one aqueous solution containing a component selected from the group consisting of sodium thiosulfate, hydrogen iodide and sodium sulfide to remove oxygen difluoride.

2. A process for purifying a nitrogen trifluoride gas according to claim 1 wherein the concentration of hydrogen fluoride is made 100 ppm or lower by contacting the nitrogen trifluoride gas with water or a sodium hydroxide aqueous solution.

3. A process for purifying a nitrogen trifluoride gas according to claim 1 wherein the temperature of contacting the nitrogen trifluoride gas with the aqueous solution is 0° to 20° C.

4. A process for purifying a nitrogen trifluoride gas according to claim 1 wherein said aqueous solution is circulated through a gas scrubber provided with a bed of packing in a vessel through which said $OF_2$ containing $NF_3$ gas is ventilated to contact the nitrogen trifluoride gas with the aqueous solution.

5. A process of removing oxygen difluoride from a nitrogen trifluoride gas containing a mixture of oxygen difluoride and hydrogen fluoride, said process comprising;
   (a) removing the hydrogen fluoride from the nitrogen trifluoride gas whereby the nitrogen trifluoride gas contains 100 ppm or less hydrogen fluoride, and
   (b) removing the oxygen difluoride by contacting said nitrogen trifluoride gas of step (a) with an aqueous solution containing at least one component selected from the group consisting of sodium thiosulfate, hydrogen iodide and sodium sulfide.

6. The method of claim 5 wherein said hydrogen fluoride is removed by contacting said gas with water or an aqueous solution of sodium hydroxide.

7. The method of claim 5 wherein said aqueous solution is a 0.1N to 2N solution of said component.

8. The method of claim 5 wherein said aqueous solution is a 0.5N to 2N solution of said component.

9. The process of claim 5 comprising introducing said nitrogen trifluoride gas into a gas scrubber and circulating said aqueous solution through said gas scrubber to contact the aqueous solution with said nitrogen trifluoride gas, wherein said gas scrubber contains a bed of packing.

10. A process of purifying a nitrogen trifluoride gas containing oxygen difluoride or a mixture of oxygen difluoride and hydrogen fluoride, said process comprising:
   (a) removing hydrogen fluoride from said nitrogen trifluoride gas when said gas contains more than 100 ppm hydrogen fluoride to a level of less than 100 ppm hydrogen fluoride; and
   (b) contacting said nitrogen trifluoride gas containing less than 100 ppm hydrogen fluoride with an aqueous solution of at least one component selected from the group consisting of sodium thiosulfate, hydrogen iodide and sodium sulfide to remove the oxygen difluoride.

* * * * *